United States Patent Office 3,523,155
Patented Aug. 4, 1970

---

3,523,155
PROCESSES FOR PREPARATION OF THERAPEUTIC SERUMS
Henry E. Meunier, 24 Avenue Alsace Lorraine, Grenoble, Isere, France
No Drawing. Filed Oct. 3, 1967, Ser. No. 672,443
Int. Cl. A61k 23/00
U.S. Cl. 424—92  12 Claims

ABSTRACT OF THE DISCLOSURE

A process for increasing formations of antibodies in animals treated with various antigens by treating the animal during the antibody producing stage with dipropylacetic acid and derivatives thereof.

GENERAL DESCRIPTION OF INVENTION

The present invention relates to a process for preparation of therapeutic serums, based on the formation of antibodies by animals in the course of immunization against various antigens.

U.S. Pats. Nos. 3,301,754 and 3,325,361 describe the use of dipropylacetic acid and its derivatives as potentiators of central nervous system depressants and as anticonvulsant agents, respectively. Also described, in the U.S. patent application Ser. No. 587,413, filed Oct. 18, 1966 are dipropylacetic acid derivatives of choline which are described as useful in treating liver disorders. In the course of pharmacalogical and clinical work developed on the basis of these previous patent disclosures it has been found that derivatives of dipropylacetic acid have, in addition, an effect of increasing the amount of serous gamma globulin. In an effort to explain this property and not intending to be bound thereby, the hypothesis has been put forth that these derivatives stimulate the antibody forming reticulo-endothelial system.

The improvement according to this invention consists essentially in a treatment in the animal producers of antibodies by compounds derived from dipropylacetic acid, including the most elementary of them, the acid itself.

To demonstrate this, a series of tests was run in the production of dosages of the antibodies formed by animals (rabbits) in the course of immunization against various antigens under treatment with different compounds of the series in comparison with control animals.

The description of certain of these tests follows constituting a reduction to practice of the invention. These tests are presented in order to disclose the invention more fully and are not intended to limit the invention in any way.

EXAMPLE I

Determination of the amount of antibodies formed by rabbits immunized with guinea pig erythrocytes and treated with depamide (di-n-propylacetamide)

The experimental principle, simply, consists of immunizing rabbits with guinea pig erythrocytes and, after three weeks of immunization, to compare, at eight day intervals, the amount of antibodies formed by the immunized rabbits and simultaneously treated with Depamide, and the amounts of antibodies formed by the immunized animals not treated with Depamide but receiving the same quantity of olive oil which serves as the solvent for Depamide.

The rabbits, of the "Fauve de Bourgogne" variety, are males of about 2.5 kg. The Depamide in solution in neutralized olive oil is injected by I.P. method in a dose of 200 mg./kg. each day for 24 days.

The antibodies are measured in the serum by the method described by Calmette.

The first dosage is effected 8 days after the last injection of the antigen (week S1), the second dosage the following week (week S2).

In the tables below are indicated the most dilute solutions of serum which still permit the obtaining of a complete hemolysis of the antigenous erythrocytes:

TABLE I.—FIRST TEST

| Week | Control Rabbits | | Treated Rabbits | |
|---|---|---|---|---|
| S1 | Animal No. 1 | 1/850 | Animal No. 3 | 1/2,000 |
|  | Animal No. 2 | 1/1,250 | Animal No. 4 | 1/2,000 |
|  |  |  | Animal No. 5 | 1/2,500 |
|  |  |  | Animal No. 6 | 1/5,000 |
|  |  |  | Animal No. 7 | 1/2,050 |
| S2 | Animal No. 1 | 1/410 | Animal No. 3 | 1/850 |
|  | Animal No. 2 | 1/250 | Animal No. 4 | 1/850 |
|  |  |  | Animal No. 5 | 1/850 |
|  |  |  | Animal No. 6 | 1/2,500 |
|  |  |  | Animal No. 7 | 1/625 |

TABLE II.—SECOND TEST

| Week | Control Rabbits | | Treated Rabbits | |
|---|---|---|---|---|
| S1 | Animal No. 1 | 1/700 | Animal No. 5 | 1/1,700 |
|  | Animal No. 2 | 1/620 | Animal No. 6 | 1/1,700 |
|  | Animal No. 3 | 1/500 | Animal No. 7 | 1/840 |
|  | Animal No. 4 | 1/620 | Animal No. 8 | 1/1,340 |
| Average |  | 1/610 |  | 1/1,395 |
| S2 | Animal No. 1 | 1/250 | Animal No. 5 | 1/625 |
|  | Animal No. 2 | 1/250 | Animal No. 6 | 1/625 |
|  | Animal No. 3 | 1/300 | Animal No. 7 | 1/300 |
|  | Animal No. 4 | 1/250 | Animal No. 8 | 1/625 |
| Average |  | 1/260 |  | 1/540 |

Results of the same order are obtained by using the antigen of sheep erythrocytes.

The following examples illustrate the determination of the amount of antigens formed by rabbits immunized by the paratyphoid A antigen (somatic antigen, paratyphoid A prepared by the Pasteur Institute).

"Fauve de Bourgogne" rabbits weighing 3kg.±250 g. were employed. Immunization was effected at the rate of two injections per week, intravenously, with increasing doses of antigen, and for a two week period, as follows: 1 ml. first week; 2 ml. second week and 3 ml third week. The animals in the course of immunization are treated with different derivatives of the n-dipropylacetic acid series, as follows:

EXAMPLE II

Sodium dipropylacetate

An aqueous solution of the sodium salt of n-dipropylacetic acid is compounded and injection is started from the first administration of antigen. The duration of treatment is three weeks at the rate of one injection of 200 mg./kg. every two days by the I.P. method.

EXAMPLE III

Choline dipropylacetate

An aqueous solution of choline dipropylacetate is administered with the same posology as indicated in Example II.

EXAMPLE IV

Dipropylacetylureide

An oily suspension of dipropylacetylureide containing 100 mg./kg. is administered by the Bucall method at a dose of 200 mg./kg. It is administered every two days for three weeks. The first administration is made the same day as the first injection of antigen.

EXAMPLE V

Dipropylacetamide

An oily suspension of dipropylacetamide containing 100 mg./ml. is administered by the I.P. method at a dose of 200 mg./kg. The duration and rate are the same as for Example IV.

The dosage amount of antibodies has been made following the seriodiagnostic technique of Widal. The blood is drawn from the central vein of the ear. Three samples of blood are taken: the first week after the first injection of antigen; the second week after the first injection of antigen and the third week after the first injection of antigen.

The following tables list the results obtained from Examples II, III, IV and V:

TABLE III.—FIRST WEEK

| Sodium dipropylacetate (Ex. II) | Dipropylacetylureide (Ex. IV) | Choline dipropylacetate (Ex. III) | Dipropylacetamide (Ex. V) | Controls |
|---|---|---|---|---|
| 1/1,600 | 1/1,600 | 1/1,600 | 1/1,600 | 1/400 |
| 1/3,200 | 1/1,600 | 1/1,600 | 1/1,600 | 1/800 |
| 1/3,200 | 1/1,250 | 1/1,250 | 1/1,250 | 1/800 |
| 1/1,600 | 1/1,600 | 1/1,600 | 1/1,600 | 1/800 |
|  | 1/800 | 1/1,600 | 1/1,600 | 1/800 |
|  |  |  |  | 1/800 |
|  |  |  |  | 1/1,250 |
|  |  |  |  | 1/400 |
| ¹ 1/2,400 | ¹ 1/1,370 | ¹ 1/1,730 | ¹ 1/1,530 | ¹ 1/756 |

¹ Average.

TABLE IV.—SECOND WEEK

| Sodium dipropylacetate (Ex. II) | Dipropylacetylureide (Ex. IV) | Choline dipropylacetate (Ex. III) | Dipropylacetamide (Ex. V) | Controls |
|---|---|---|---|---|
| 1/12,800 | 1/12,800 | 1/6,400 | 1/12,800 | 1/1,600 |
| 1/12,800 | 1/6,400 | 1/6,400 | 1/12,800 | 1/3,200 |
| 1/6,400 | 1/6,400 | 1/6,400 | 1/6,400 | 1/1,600 |
| 1/6,400 | 1/6,400 | 1/3,200 | 1/6,400 | 1/3,200 |
|  | 1/6,400 | 1/3,200 |  | 1/1,600 |
|  |  |  |  | 1/1,600 |
|  |  |  |  | 1/3,200 |
|  |  |  |  | 1/1,600 |
| ¹1/9,600 | ¹1/17,680 | ¹1/5,000 | ¹1/9,600 | ¹1/2,200 |

¹ Average.

TABLE V.—THIRD WEEK

| Sodium dipropylacetate (Ex. II) | Dipropylacetylureide (Ex. IV) | Choline dipropylacetate (Ex. III) | Dipropylacetamide (Ex. V) | Controls |
|---|---|---|---|---|
| 1/15,200 | 1/15,200 | 1/12,800 | 1/15,200 | 1/4,800 |
| 1/15,200 | 1/12,800 | 1/7,600 | 1/15,200 | 1/7,600 |
| 1/12,800 | 1/12,800 | 1/12,800 | 1/15,200 | 1/2,400 |
| 1/12,800 | 1/12,800 | 1/7,600 | 1/12,800 | 1/4,800 |
|  | 1/12,800 | 1/12,800 |  | 1/2,400 |
|  |  |  |  | 1/4,800 |
|  |  |  |  | 1/3,800 |
| ¹1/14,000 | ¹1/13,200 | ¹1/10,700 | ¹1/14,600 | ¹1/4,300 |

¹ Average.

EXAMPLE VI

Determination of the amount of antibodies formed by rabbits immunized by the paratyphoid A antigen and flagellar paratyphoid H antigen, and treated with choline dipropylacetate The experimental technique is the same as for antigen O, but as it is known, the antibodies appear more slowly. The results obtained are in the following table:

TABLE VI

| Week | Choline Dipropylacetate | Controls |
|---|---|---|
| First | 0 | 0 |
|  | 0 | 0 |
|  | 0 | 0 |
|  | 1/400 | 1/100 |
|  | 1/400 | 0 |
| Second | 1/6,400 | 1/3,200 |
|  | 1/6,400 | 1/3,200 |
|  | 1/12,800 | 1/3,200 |
|  | 1/6,400 | 1/6,400 |
|  | 1/6,400 | 1/3,200 |
| Third | 1/25,600 | 1/12,850 |
|  | 1/25,600 | 1/12,800 |
|  | 1/12,800 | 1/7,600 |
|  | 1/15,200 | 1/7,600 |
|  | 1/15,200 | 1/4,800 |
| Average | 1/18,800 | 1/9,000 |

This activity of derivatives of dipropylacetic acid and including the most elementary of them, the acid itself, leads, according to the present invention, to their commercial use for the increase in production of antibodies in the course of the preparation of therapeutic serums.

Certain dipropylacetyl derivatives are indicated in the previous examples. It is obvious that other corresponding dilower alkyl substituents containing 2–7 carbon atoms can be employed in place of the dipropyl moiety such as the diethyl, dibutyl, dipentyl and diheptyl.

Other embodiments and modifications of this invention will suggest themselves to those skilled in the art, and all such of these as come within the spirit of this invention are included within its scope as best defined by the appended claims.

I claim:

1. A method of increasing the yield of antibodies in warm blooded animals comprising administering to said animals in an amount sufficient to increase said antibodies, a compound selected from the group consisting of dialkyl acetic acid and alkali metal salts, choline salts, ureides and amides thereof, said compound being administered in conjunction with the administration of an antigen.

2. The method as defined in claim 1 wherein said compound is dialkyl acetic acid.

3. The method as defined in claim 1 wherein said compound is dipropylacetic acid.

4. The method as defined in claim 1 wherein said compound is dipropylacetamide.

5. The method as defined in claim 1 wherein said compound is sodium dipropylacetate.

6. The method as defined in claim 1 wherein said compound is dipropylacetylureide.

7. The method as defined in claim 1 wherein said compound is choline dipropylacetate.

8. The method as defined in claim 1 wherein said compound is dipropylacetic acid.

9. The method as defined in claim 1 wherein said compound is administered in more than a single dose.

10. The method as defined in claim 9 wherein said antigen is administered in increasingly larger amounts.

11. A method of increasing the yield of paratyphoid antibodies in a warm blooded animal which comprises administering parenterally dipropylacetamide to said animal, in conjunction with the administration of paratyphoid antigen.

12. The method of claim 11 wherein the animal is a rabbit.

References Cited

UNITED STATES PATENTS 3,301,754 1/1967 Meunier _____ 424—311 XR
3,325,361 6/1967 Meunier _____ 424—322 XR SHEP K. ROSE, Primary Examiner U.S. Cl. X.R.

424—85, 87, 88, 311, 322

PO-1050
(5/69)

UNITED STATES PATENT OFFICE
CERTIFICATE OF CORRECTION

Patent No. 3,523,155      Dated August 4, 1970

Inventor(s) Henry E. Meunier

It is certified that error appears in the above-identified patent and that said Letters Patent are hereby corrected as shown below:

Column 1, in the caption, following the line giving filing date and serial number, insert the following line:
-- Claims priority, application France, Oct. 14, 1966, 80,003 --.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents